United States Patent
Snook

(10) Patent No.: US 7,207,764 B1
(45) Date of Patent: Apr. 24, 2007

(54) WHEEL LIFT SYSTEM

(76) Inventor: Jonathan D. Snook, 602 Stratford Dr., Southlake, TX (US) 76092

( * ) Notice: Subject to any disclaimer, the term of this patent is extended or adjusted under 35 U.S.C. 154(b) by 262 days.

(21) Appl. No.: 10/877,559

(22) Filed: Jun. 25, 2004

(51) Int. Cl.
*B65G 7/04* (2006.01)

(52) U.S. Cl. ............... 414/427; 254/122; 187/211

(58) Field of Classification Search ........ 414/426–429, 414/911, 458; 187/211; 211/20–21; 254/120, 254/122; 29/273; 7/100; 294/118
See application file for complete search history.

(56) References Cited

U.S. PATENT DOCUMENTS

| | | | | |
|---|---|---|---|---|
| 2,326,684 A | * | 8/1943 | Ross | 414/427 |
| 2,364,918 A | * | 12/1944 | Roberson | 414/427 |
| 2,429,723 A | * | 10/1947 | Kelley | 280/43.16 |
| 2,570,587 A | | 10/1951 | Noone et al. | 214/1 |
| 2,725,997 A | * | 12/1955 | Shvetz | 414/427 |
| 3,080,066 A | * | 3/1963 | Berridge et al. | 108/136 |
| 3,976,212 A | | 8/1976 | Sanchez | 214/332 |
| 3,987,915 A | * | 10/1976 | Conner | 414/807 |
| 4,530,536 A | * | 7/1985 | Williams | 294/118 |
| 4,586,696 A | * | 5/1986 | Mugford et al. | 254/122 |
| 4,597,711 A | | 7/1986 | Liebermann | 414/427 |
| 4,724,930 A | * | 2/1988 | VanLierop | 187/204 |
| 4,872,694 A | | 10/1989 | Griesinger | 280/79.4 |
| 5,074,608 A | * | 12/1991 | Gabriel | 294/82.32 |
| 5,180,141 A | | 1/1993 | Hunt | 254/131 |
| 5,348,438 A | | 9/1994 | Roberts | 414/426 |
| 5,464,314 A | | 11/1995 | Laaksonen | 414/427 |
| 5,562,389 A | | 10/1996 | Mitchell | 414/428 |
| 5,581,866 A | | 12/1996 | Barkus | 29/273 |
| 5,722,513 A | * | 3/1998 | Rowan et al. | 187/269 |
| 5,855,359 A | * | 1/1999 | Chipperfield | 254/88 |
| 5,897,171 A | | 4/1999 | Seifert | 301/35.62 |
| 6,095,745 A | | 8/2000 | Garnett | 414/427 |
| 6,106,214 A | | 8/2000 | Saffelle et al. | 414/427 |
| 6,152,505 A | * | 11/2000 | Coyne | 294/16 |
| 6,237,206 B1 | | 5/2001 | Bezemer et al. | 29/273 |
| 6,276,732 B1 | * | 8/2001 | Hauss | 294/16 |
| 6,298,535 B1 | | 10/2001 | Lower | 29/273 |
| 6,527,321 B1 | * | 3/2003 | Kuciauskas | 294/3 |

FOREIGN PATENT DOCUMENTS

| | | | | |
|---|---|---|---|---|
| CA | 2124968 A | * | 12/1995 | |
| FR | 2749838 A | * | 6/1996 | |
| JP | 08318703 A | * | 12/1996 | |
| JP | 09267607 A | * | 10/1997 | |

OTHER PUBLICATIONS

Wheel Dollies, Norco Industries, Website Printout, Jun. 9, 2004, 3 pages.

(Continued)

*Primary Examiner*—Patrick Mackey
*Assistant Examiner*—Charles Greenhut

(57) ABSTRACT

A wheel lift system for efficiently lifting and positioning a wheel and tire onto a wheel hub. The wheel lift system includes a first arm and a second arm pivotally attached to one another, a plurality of caster wheels attached to the lower portion of the arms, and a first support and a second support extending from the arms respectively for supporting a wheel and tire. A bias member is preferably attached to the arms for providing a bias force that assists in elevating the wheel and tire.

18 Claims, 11 Drawing Sheets

OTHER PUBLICATIONS

Wheel Dollies, Jack-X-Change, Website Printout, Jun. 9, 2004, 1 page.
Truck Wheel Dolly, All Tire Supply Company, Website Printout, May 26, 2004, 2 pages.
Hydraulic Wheel Dolly, All Tire Supply Company, Website Printout, May 26, 2004, 1 page.
Battery Powered Mobile Wheel Lift, Productivity Tools and Equipment, Website Printout, 2 pages.
Capacity Wheel Dolly, All Tire Supply Company, Website Printout, May 26, 2004, 1 page.
Craftsman Commercial Wheel Lift, Automotive Garage Equipment, Website Printout, May 26, 2004, 4 pages.

* cited by examiner

WHEEL LIFT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to wheel lift devices and more specifically it relates to a wheel lift system for efficiently lifting and positioning a wheel and tire onto a wheel hub.

2. Description of the Related Art

Wheel lift devices have been in use for years. Conventional wheel lift devices are typically comprised of hydraulic/pneumatic bottle jack lifting system that lifts the wheel in position with respect to a wheel hub. Another method of lifting wheels into a desired position with respect to a wheel hub is by manually positioning the wheel with blocks and related objects. Further methods can be found using winches or electric motors that lift a wheel into position. Conventional wheel lift devices are relatively complex and expensive. In addition, conventional wheel lift devices are relatively cumbersome to operate.

While these devices may be suitable for the particular purpose to which they address, they are not as suitable for efficiently lifting and positioning a wheel and tire onto a wheel hub.

In these respects, the wheel lift system according to the present invention substantially departs from the conventional concepts and designs of the prior art, and in so doing provides an apparatus primarily developed for the purpose of efficiently lifting and positioning a wheel and tire onto a wheel hub.

BRIEF SUMMARY OF THE INVENTION

In view of the foregoing disadvantages inherent in the known types of wheel lift devices now present in the prior art, the present invention provides a new wheel lift system construction wherein the same can be utilized for efficiently lifting and positioning a wheel and tire onto a wheel hub.

The general purpose of the present invention, which will be described subsequently in greater detail, is to provide a new wheel lift system that has many of the advantages of the wheel lift devices mentioned heretofore and many novel features that result in a new wheel lift system which is not anticipated, rendered obvious, suggested, or even implied by any of the prior art wheel lift devices, either alone or in any combination thereof.

To attain this, the present invention generally comprises a first arm and a second arm pivotally attached to one another, a plurality of caster wheels attached to the lower portion of the arms, and a first support and a second support extending from the arms respectively for supporting a wheel and tire. A bias member is preferably attached to the arms for providing a bias force that assists in elevating the wheel and tire.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a wheel lift system that will overcome the shortcomings of the prior art devices.

A second object is to provide a wheel lift system for efficiently lifting and positioning a wheel and tire onto a wheel hub.

Another object is to provide a wheel lift system that is relatively inexpensive.

An additional object is to provide a wheel lift system that does not require complex control devices or motors to operate.

A further object is to provide a wheel lift system that is easily maneuverable.

Another object is to provide a wheel lift system that is relatively lightweight and compact in size.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
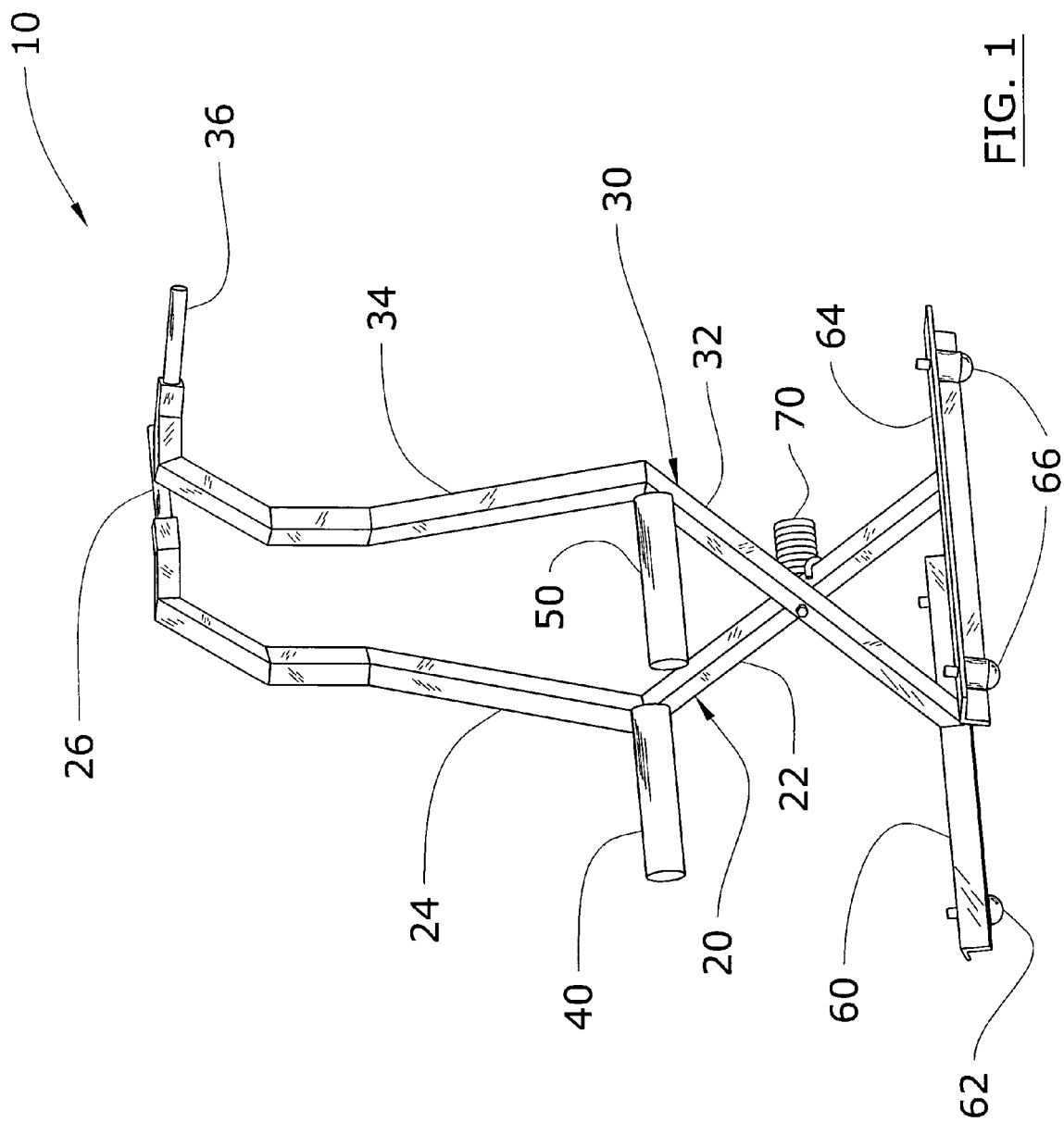
FIG. 1 is an upper perspective view of the present invention in the upright position.
Figure 2:
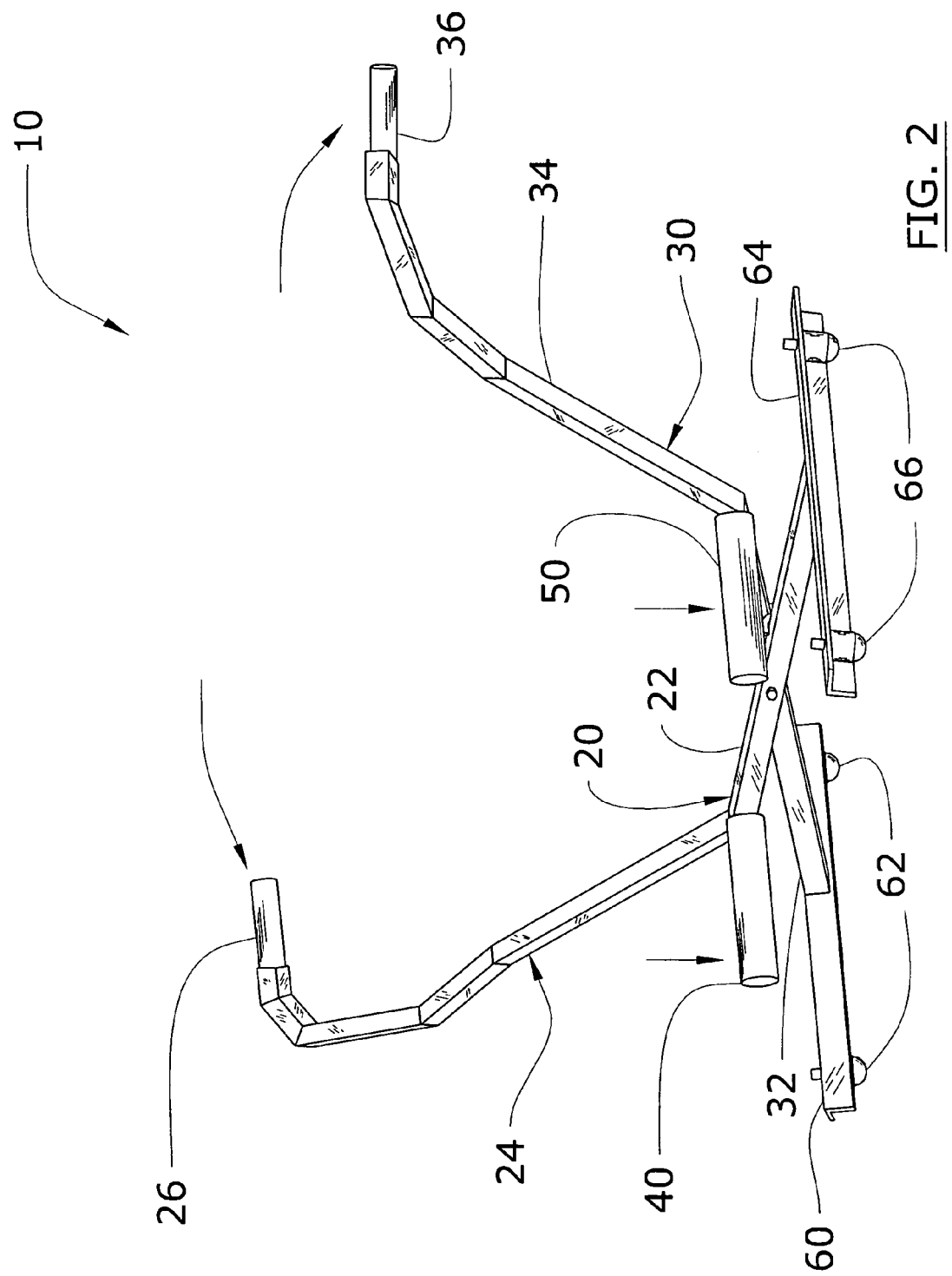
FIG. 2 is an upper perspective view of the present invention in the lowered position.

Turning now descriptively to the drawings, in which similar reference characters denote similar elements throughout the several views, FIGS. 1 through 11 illustrate a wheel lift system 10, which comprises a first arm 20 and a second arm 30 pivotally attached to one another, a plurality of wheels 62, 66 attached to the lower portion of the arms, and a first support 40 and a second support 50 extending from the arms respectively for supporting a wheel and tire 12. A bias member 70 is preferably attached to the arms for providing a bias force that assists in elevating the wheel and tire 12.

B. Arms

The first arm 20 and the second arm 30 are pivotally attached to one another at a pivot point preferably in a crossing manner forming an X-shaped structure as shown in FIGS. 4 through 11 of the drawings. The pivot point may be at various locations, however the pivot point is preferably at an equal distance from a lower end for each of the arms.

The first arm 20 is preferably comprised of a first lower segment 22 below the pivot point and a first upper segment 24 above the pivot point as shown in FIGS. 4 through 11 of the drawings. The second arm 30 is also preferably comprised of a second lower segment 32 below the pivot point and a second upper segment 34 above the pivot point that mirrors the structure of the first arm 20.

Figure 3:
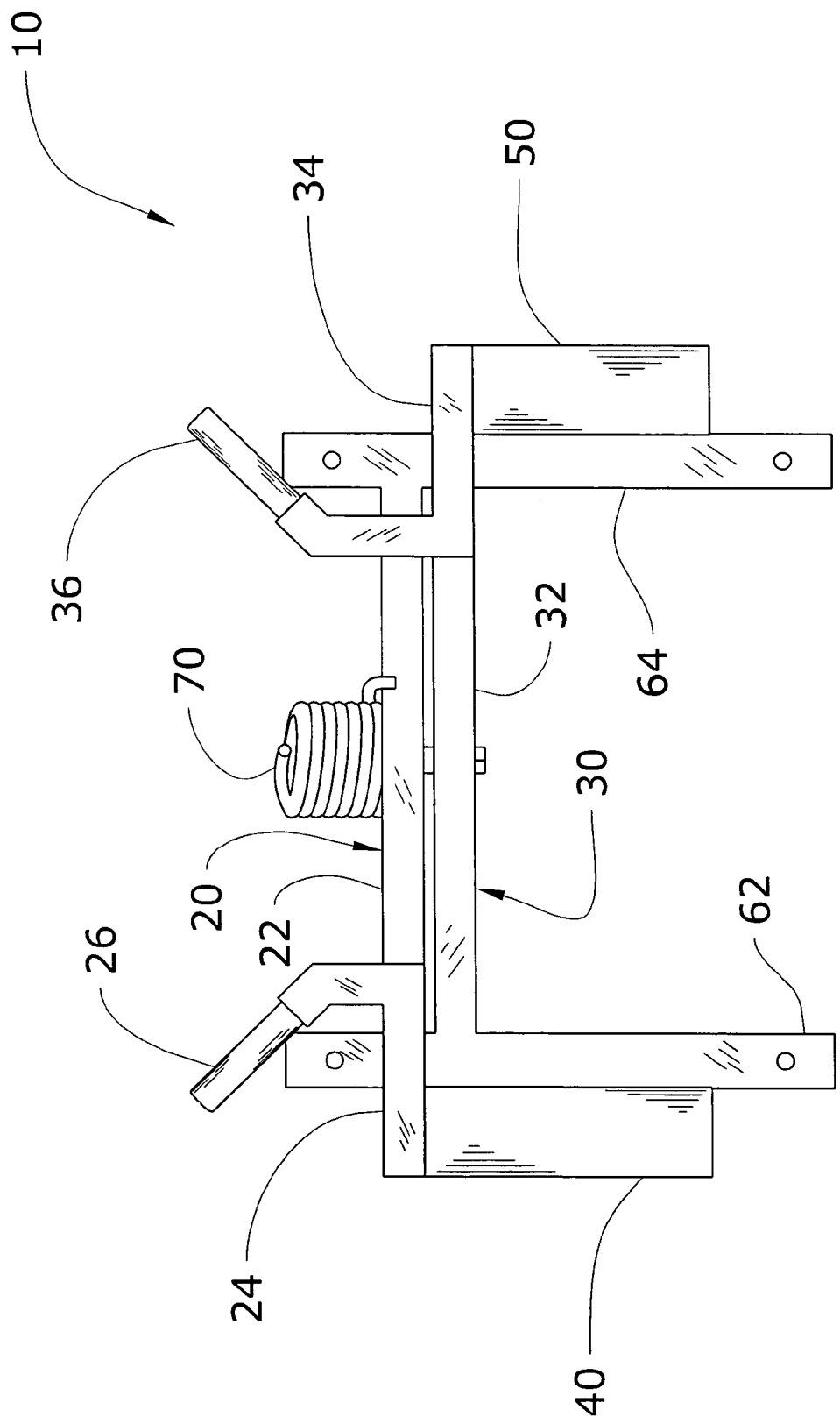
FIG. 3 is a top view of the present invention.

A first handle 26 extends from the first upper segment 24 of the first arm 20 and a second handle 36 extends from the second upper segment 34 of the second arm 30 as shown in FIG. 3 of the drawings. The handles 26, 36 may be comprised of various structures that are easy for a user to grasp. The upper segments 24, 34 are preferably sufficiently long enough to allow the user to comfortably grasp the handles 26, 36 while fully upright in order to maneuver the device.

C. Supports

The first support 40 extends from the first arm 20 as shown in FIGS. 2 through 11 of the drawings. The second support 50 extends from the second arm 30 as further shown in the figures. The first support 40 and the second support 50 are substantially parallel to one another for supporting a tire 12 between thereof as best illustrated in FIG. 3 of the drawings.

The first support 40 and the second support 50 preferably extend substantially transversely from the first arm 20 and the second arm 30 respectively for removably supporting the tire 12 as further shown in FIG. 3 of the drawings. The supports 40, 50 may be comprised of various elongated structures such as but not limited to rollers, rods and the like.

D. Bases

The first base 60 is attached to a lower end of the first arm 20 and the second base 64 is attached to a lower end of the second arm 30 as shown in FIGS. 1 through 11 of the drawings. The first base 60 and the second base 64 preferably extend in a direction similar to the supports 40, 50 to provide support for when a tire 12 is positioned upon the supports 40, 50 as shown in FIG. 3 of the drawings.

A plurality of first wheels 62 are attached to the first base 60 and a plurality of second wheels 66 are attached to the second base 64. The first wheels 62 and the second wheels 66 are preferably comprised of caster wheels or other wheels capable of rotating in a three-hundred-sixty degree manner.

E. Bias Member

Figure 4:
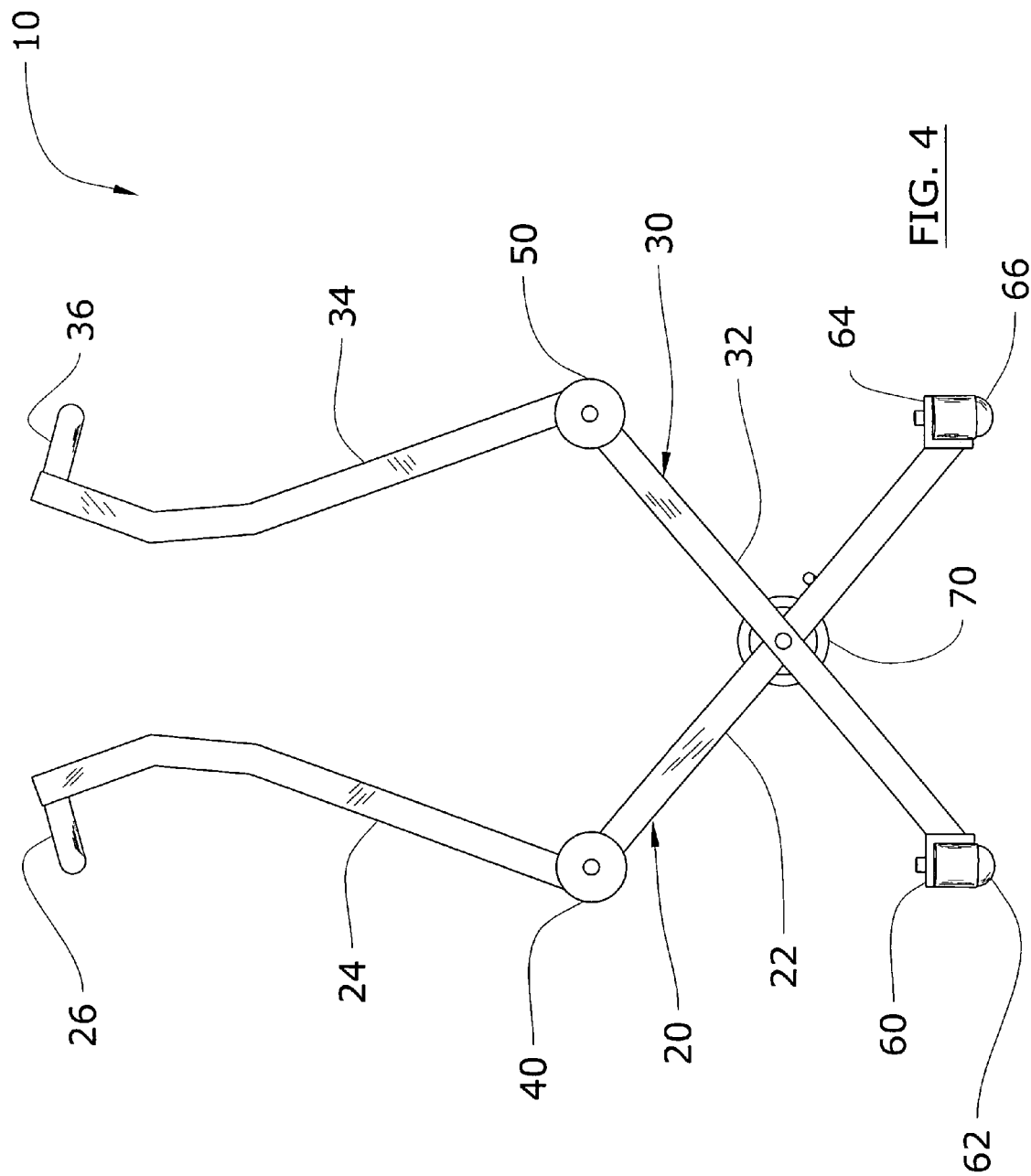
FIG. 4 is a front view of the present invention in the upright position.
Figure 7:
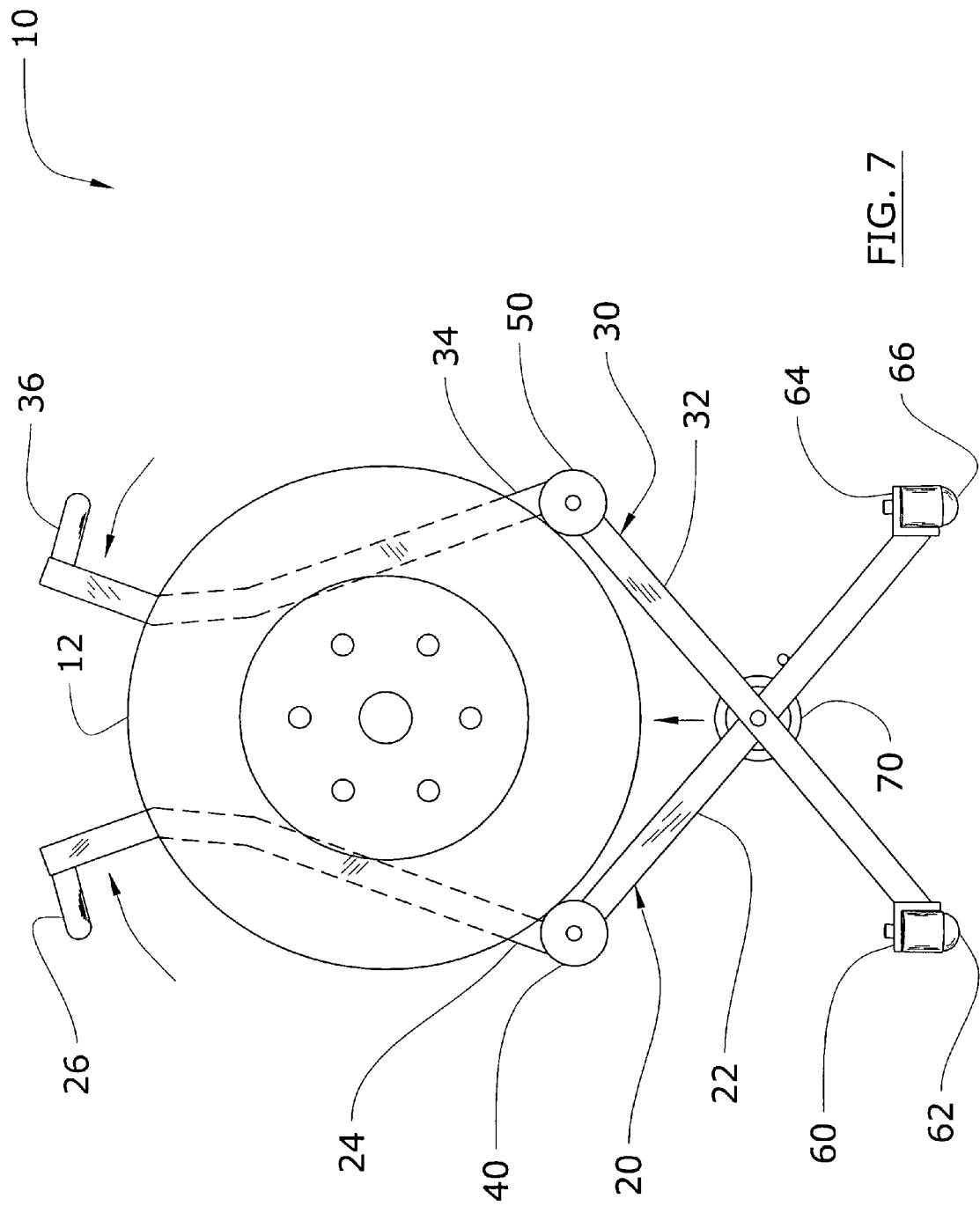
FIG. 7 is a front view of the present invention in the upright position supporting a wheel.

The bias member 70 is attached to the first arm 20 and the second arm 30 for providing a bias force that assists in elevating a wheel and tire 12 positioned upon the first support 40 and the second support 50. The bias member 70 applies a bias force that attempts to elongate the present invention in vertical manner. FIGS. 4 and 7 illustrate the present invention when in an upright position. The bias force may be capable of elevating a wheel and tire 12 positioned upon the supports 40, 50. The bias force is preferably at least capable of assisting the user to elevate the wheel and tire 12 positioned upon the supports 40, 50, though the bias force may be greater for elevating the wheel and tire 12 without requiring the physical assistance of the user.

FIGS. 1 through 7 illustrate the bias member 70 as a torsion spring wherein the bias force is comprised of a rotational force applied to the first arm 20 and the second arm 30 in opposite manners. The torsion spring is attached to both the first arm 20 and the second arm 30 thereby causing the first arm 20 to rotate in a clockwise manner and the second arm 30 to rotate in a counter-clockwise manner as shown in FIG. 7 of the drawings.

Figure 8:
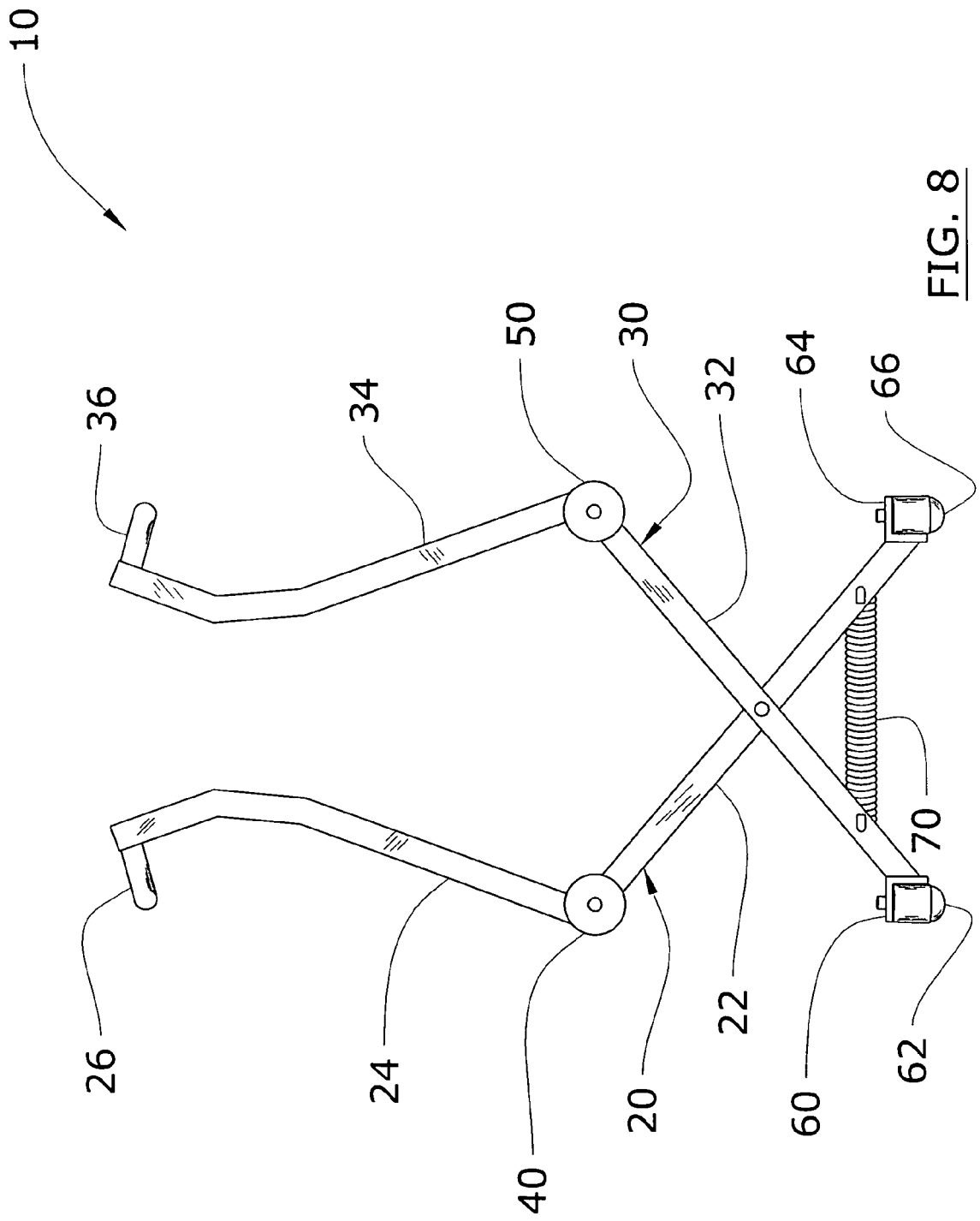
FIG. 8 is a front view of a first alternative embodiment of the present invention.
Figure 9:
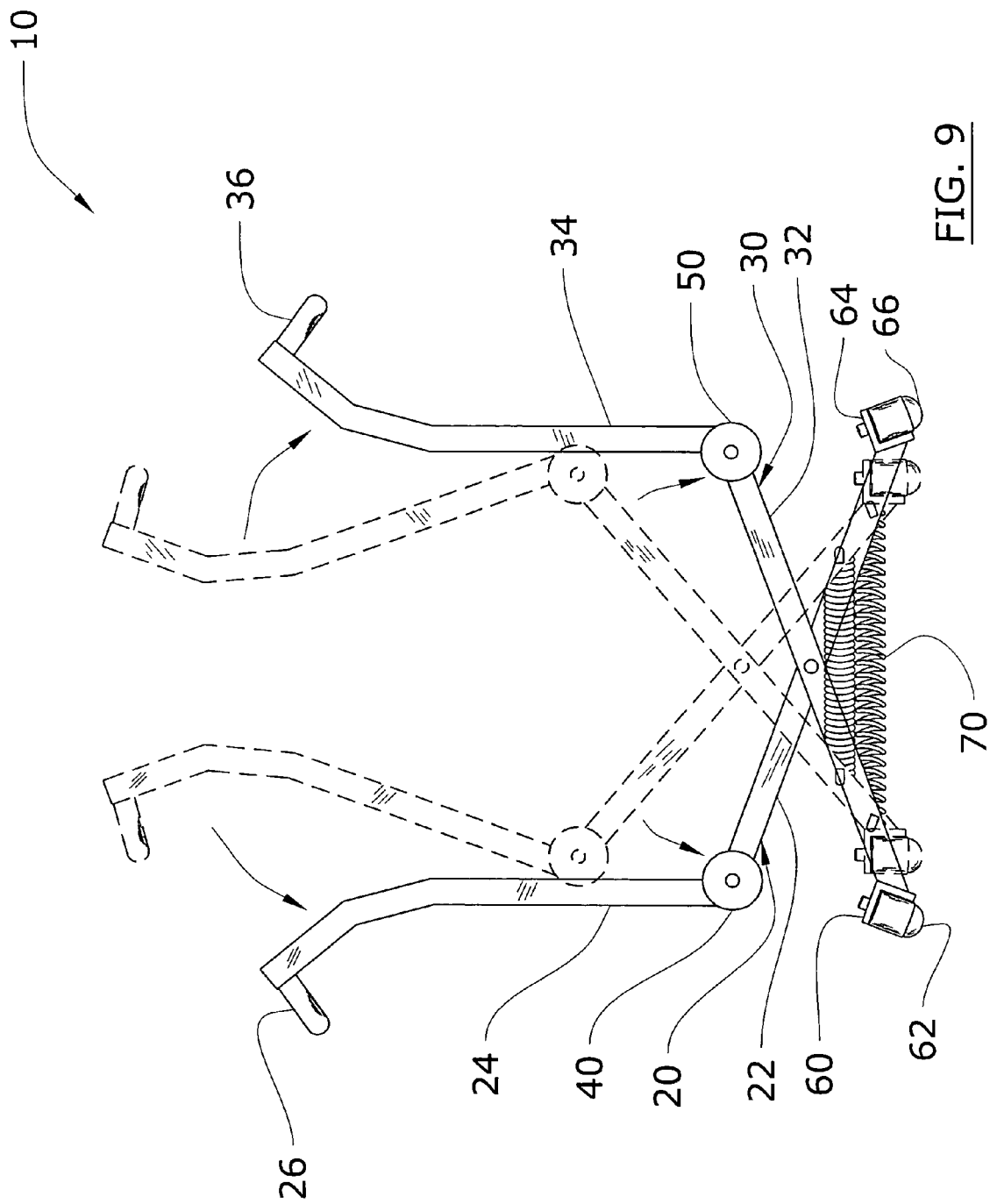
FIG. 9 is a front view of the first alternative embodiment of the present invention in the lowered position.
Figure 10:
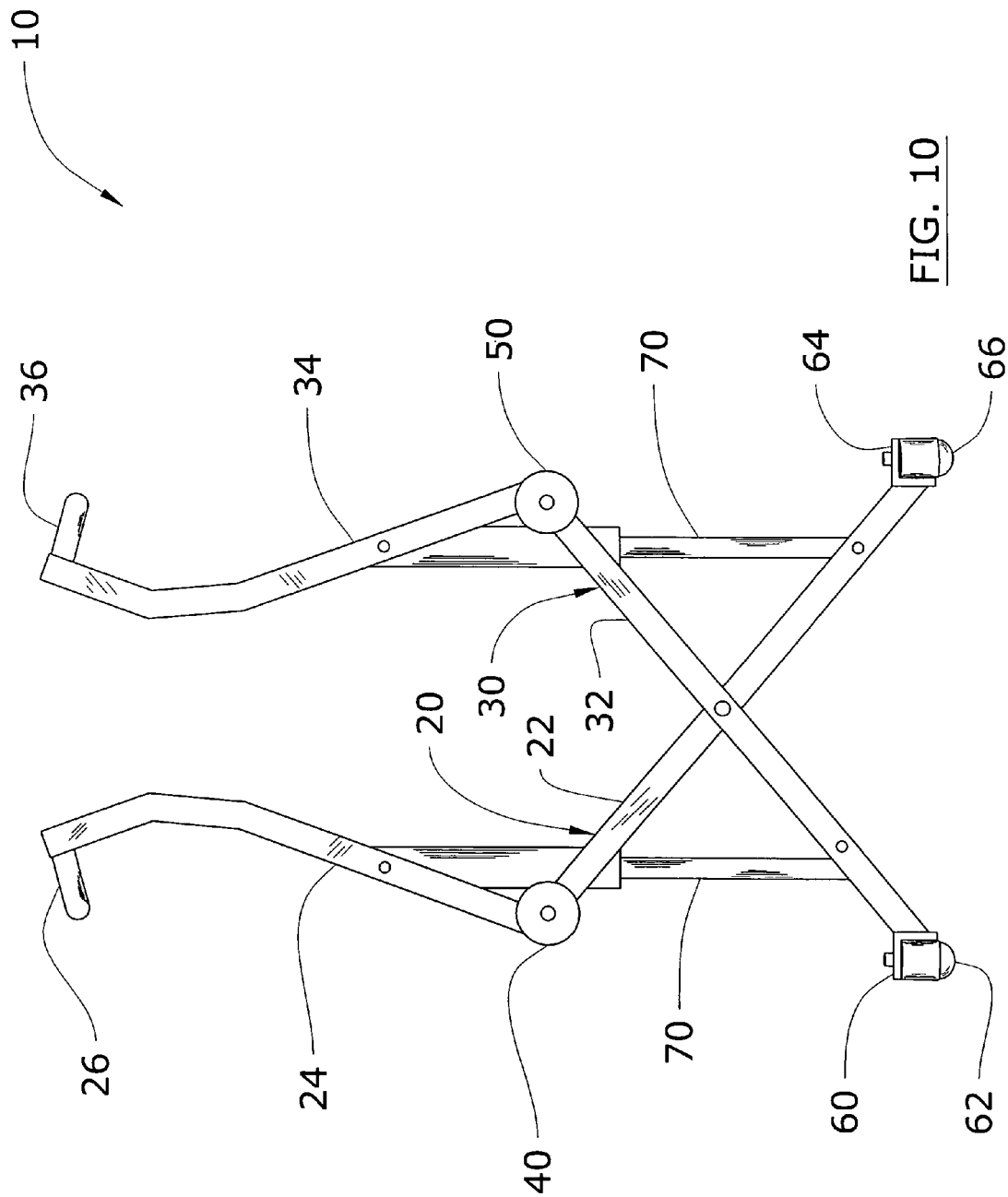
FIG. 10 is a front view of a second alternative embodiment of the present invention.
Figure 11:
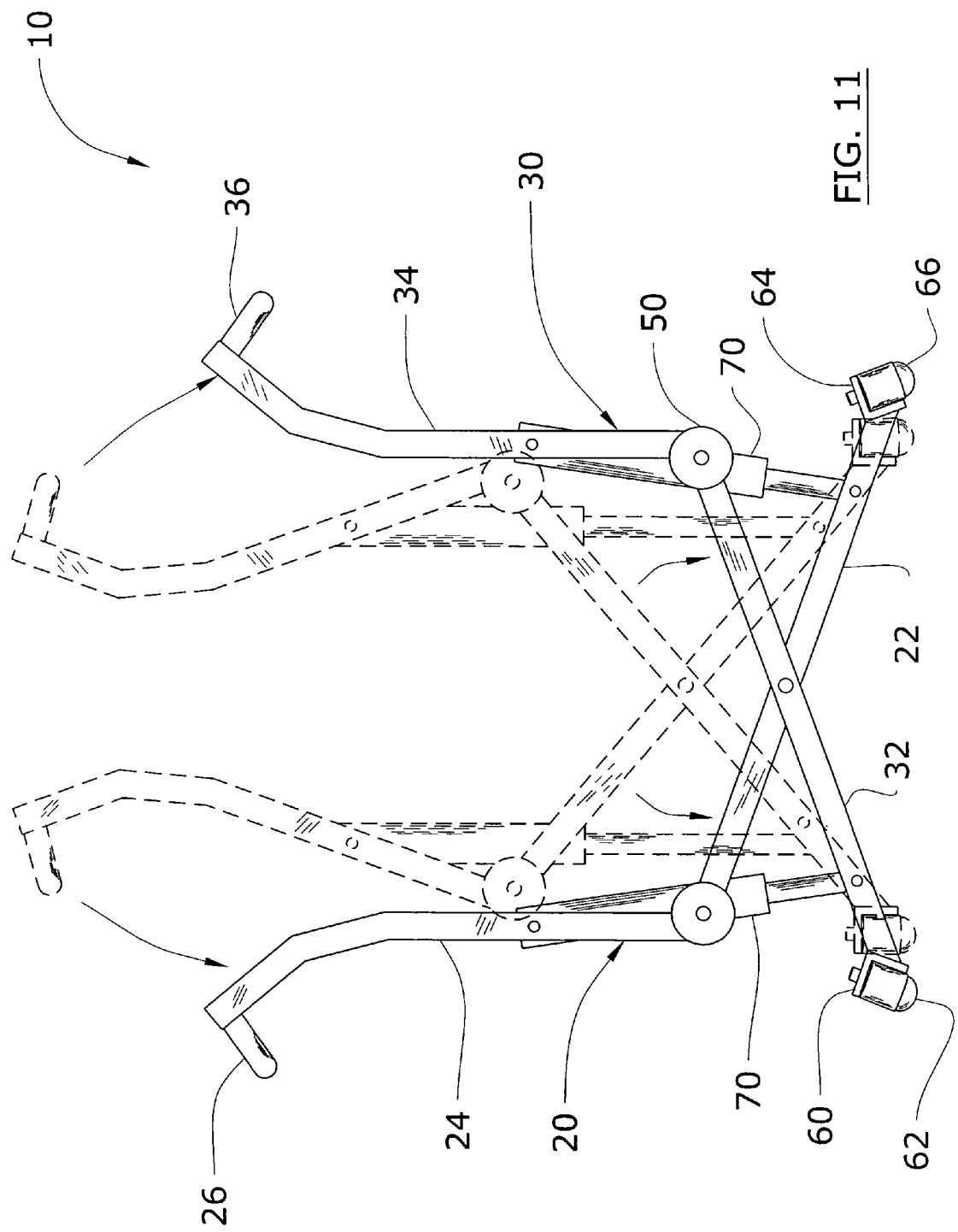
FIG. 11 is a front view of the second alternative embodiment of the present invention in the lowered position.

FIGS. 8 and 9 illustrate the bias member 70 as a spring (or other elongated member capable of being stretched) extending between the lower portions of the first arm 20 and the second arm 30 for drawing the respective lower portions of the arms 20, 30. FIGS. 10 and 11 illustrate the bias member 70 as an actuator connected to a lower portion of the first arm 20 and an upper portion of the second arm 30. The actuator may be comprised of a compressed gas actuator or spring actuator that is capable of applying an extending force.

F. Operation of Invention

Figure 5:
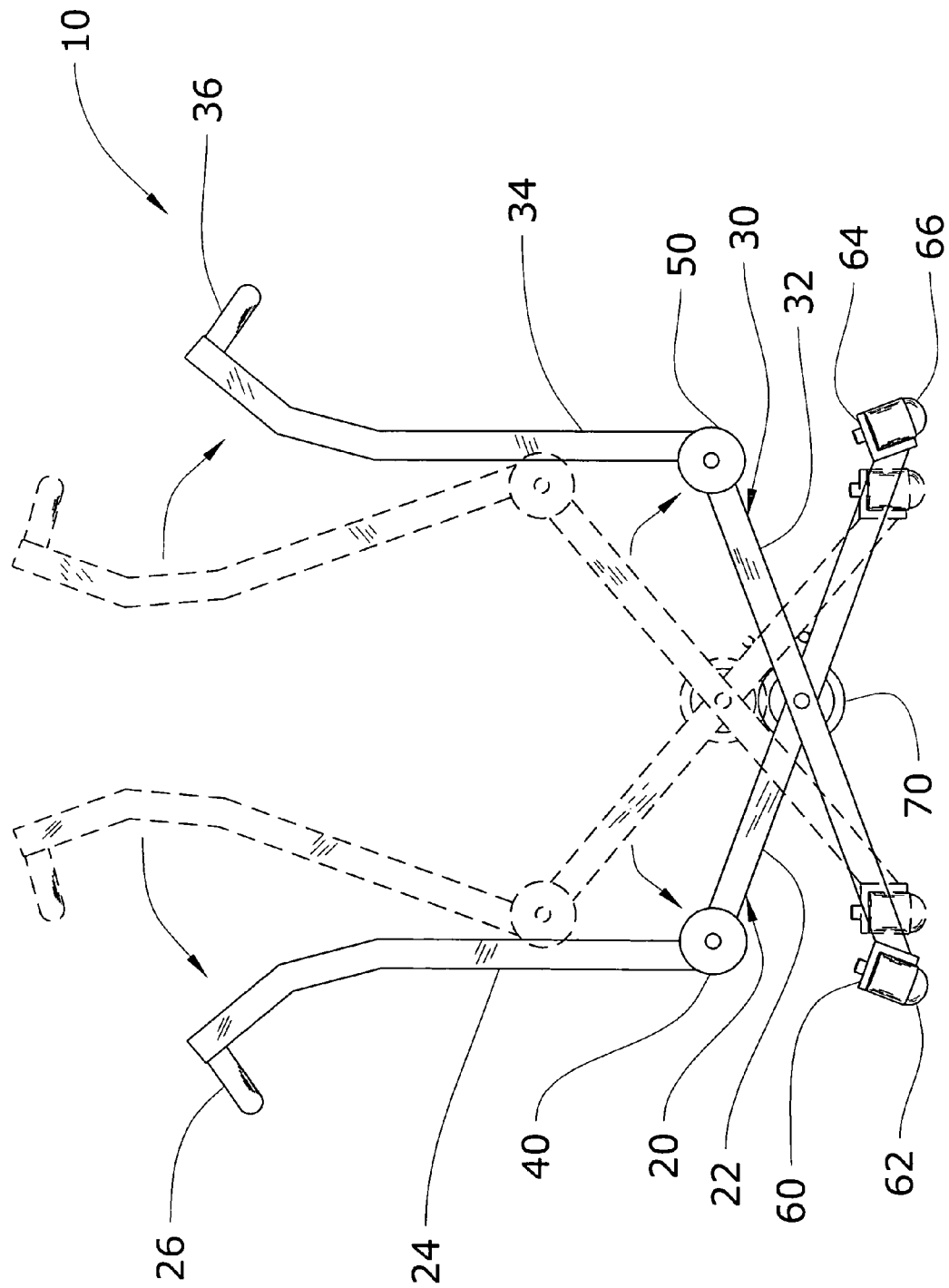
FIG. 5 is a front view of the present invention in the lowered position.
Figure 6:
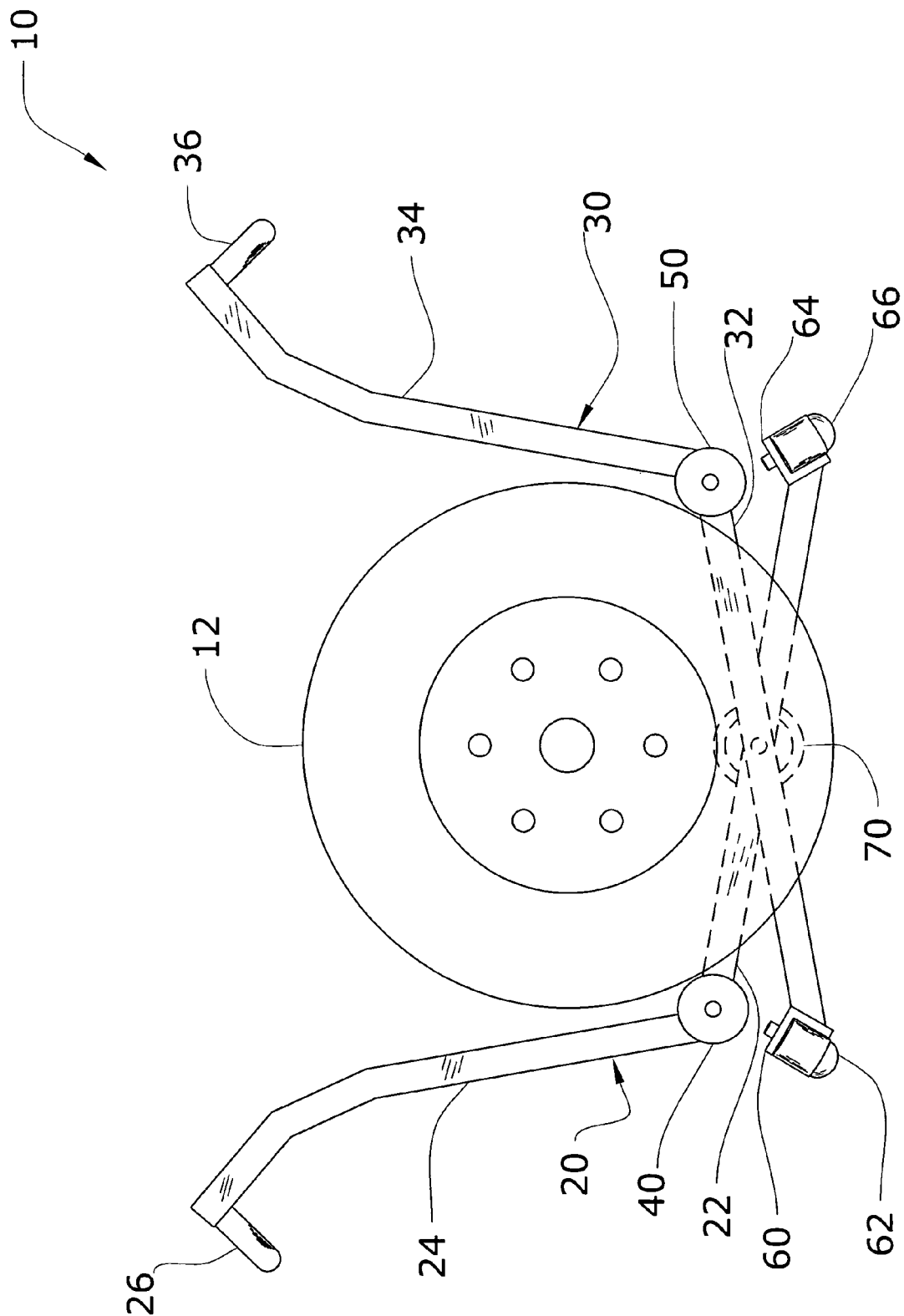
FIG. 6 is a front view of the present invention in the lowered position supporting a wheel.

In operation, the user lowers the supports 40, 50 by pushing down on the bias member 70 with the user's foot or other location as shown in FIGS. 5 and 6 of the drawings. The user then positions the device so that the supports 40, 50 are under the lower periphery of the wheel and tire 12 as shown in FIG. 6 of the drawings. The user is then able to position the wheel and tire 12 near a wheel hub that the user wants to attach the wheel and tire 12 to. By manipulating the handles and allowing the bias member 70 to assist in the elevation of the wheel and tire 12, the arms 20, 30 are caused to rotate opposite of one another causing the supports 40, 50 along with the supported wheel and tire 12 to effectively be raised as shown in FIG. 7 of the drawings. The user is able to maneuver the position of the wheel and tire 12 with the wheels 62, 66 along with adjusting the vertical position by adjusting the force applied to the wheel and tire 12 by the user's hands. After the wheel and tire 12 is properly aligned vertically, the wheel and tire 12 is rotated on the supports 40, 50 to align the lug nut openings. The wheel and tire 12 is then attached utilizing conventional fasteners. After the wheel and tire 12 has been fully or partially attached to the wheel hub, the present invention is lowered and removed from beneath the wheel and tire 12 for use upon another wheel and tire 12.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A wheel lift system, comprising:
   a first arm;
   a second arm pivotally attached to said first arm at a pivot point in a crossing manner;
   wherein said first arm is comprised of a first lower segment below said pivot point and a first upper segment above said pivot point, and wherein said second arm is comprised of a second lower segment below said pivot point and a second upper segment above said pivot point;
   a first handle attached to said first upper segment and a second handle attached to said second upper segment;
   a first support extending from said first arm;
   a second support extending from said second arm, wherein said first support and said second support are capable of supporting a wheel and tire;
   a first base attached to a lower end of said first arm;
   a second base attached to a lower end of said second arm;
   at least one first wheel attached to said first base;
   at least one second wheel attached to said second base, wherein said at least one first wheel and said at least one second wheel adjust toward each other along with said first arm and said second arm; and
   a bias member attached to said first arm and said second arm for providing a bias force that assists in elevating a tire positioned upon said first support and said second support.

2. The wheel lift system of claim 1, wherein said at least one first wheel and said at least one second wheel are comprised of caster wheels.

3. The wheel lift system of claim 1, wherein said bias force is comprised of a rotational force applied to said first arm and said second arm in opposite manners.

4. The wheel lift system of claim 3, wherein said bias member is comprised of a torsion spring.

5. The wheel lift system of claim 1, wherein said bias member is comprised of a spring extending between said first arm and said second arm.

6. The wheel lift system of claim 5, wherein said spring extends between a lower portion of said first arm and said second arm for drawing the respective lower portions of said arms together.

7. The wheel lift system of claim 1, wherein said bias member is connected to a lower portion of said first arm and an upper portion of said second arm.

8. The wheel lift system of claim 1, wherein said first arm and said second arm form an X-shaped structure.

9. The wheel lift system of claim 1, wherein said first support and said second support are substantially parallel to one another.

10. The wheel lift system of claim 9, wherein said first support and said second support extend substantially transversely from said first arm and said second arm respectively.

11. The wheel lift system of claim 1, wherein said first support and said second support are comprised of elongated rollers.

12. A wheel lift system, comprising:
    a first arm;
    a second arm pivotally attached to said first arm at a pivot point in a crossing manner forming an X-shaped structure, wherein said first arm is comprised of a first lower segment below said pivot point and a first upper segment above said pivot point and wherein said second arm is comprised of a second lower segment below said pivot point and a second upper segment above said pivot point;
    a first handle extending from said first upper segment;
    a second handle extending from said second upper segment;
    a first support extending from said first arm;
    a second support extending from said second arm, wherein said first support and said second support are substantially parallel to one another, and wherein said first support and said second support extend substantially transversely from said first arm and said second arm respectively for removably supporting a tire;
    a first base attached to a lower end of said first arm;
    a second base attached to a lower end of said second arm;
    a plurality of first wheels attached to said first base;
    a plurality of second wheels attached to said second base, wherein said first wheels and said second wheels are comprised of caster wheels; and
    a bias member attached to said first arm and said second arm for providing a bias force that assists in elevating a tire positioned upon said first support and said second support.

13. The wheel lift system of claim 12, wherein said bias member is comprised of a torsion spring and wherein said bias force is comprised of a rotational force applied to said first arm and said second arm in opposite manners.

14. The wheel lift system of claim 12, wherein said bias member is comprised of a spring extending between said first arm and said second arm, wherein said spring extends between a lower portion of said first arm and said second arm for drawing the respective lower portions of said arms together.

15. The wheel lift system of claim 12, wherein said bias member is connected to a lower portion of said first arm and an upper portion of said second arm.

16. A wheel lift system, comprising:
    a first arm;
    a second arm pivotally attached to said first arm at a pivot point in a crossing manner;
    wherein said first arm is comprised of a first lower segment below said pivot point and a first upper segment above said pivot point, and wherein said second arm is comprised of a second lower segment below said pivot point and a second upper segment above said pivot point;
    a first handle attached to said first upper segment and a second handle attached to said second upper segment;
    a first support extending from said first arm;
    a second support extending from said second arm, wherein said first support and said second support are capable of supporting a wheel and tire;
    a first base attached to a lower end of said first arm;
    a second base attached to a lower end of said second arm; and
    a bias member attached to said first arm and said second arm for providing a bias force upon said first arm and said second arm with respect to one another that assists in elevating a tire positioned upon said first support and said second support.

17. The wheel lift system of claim 16, wherein said bias force is comprised of a rotational force applied to said first arm and said second arm in opposite manners.

18. The wheel lift system of claim 16, wherein said bias member is comprised of a torsion spring.

* * * * *